United States Patent [19]
Pham et al.

[11] Patent Number: 5,826,991
[45] Date of Patent: Oct. 27, 1998

[54] PRINTER APPARATUS FOR AUTOMATED BANKING MACHINE

[75] Inventors: Tuyen Van Pham, Massillon; Thomas S. Mason, Canton, both of Ohio

[73] Assignee: InterBold, North Canton, Ohio

[21] Appl. No.: 588,967

[22] Filed: Jan. 19, 1996

[51] Int. Cl.⁶ .............................. B41J 35/28; F16D 9/00
[52] U.S. Cl. ............................................. 400/207; 464/32
[58] Field of Search .................... 400/208, 207; 464/32

[56] References Cited

U.S. PATENT DOCUMENTS

| | | | |
|---|---|---|---|
| 780,490 | 1/1905 | Anderson | 464/32 |
| 2,889,162 | 6/1959 | Norris | 464/32 |
| 2,892,329 | 6/1959 | Trigilio | 464/32 |
| 3,359,171 | 12/1967 | Hanke | 464/32 |
| 3,753,625 | 8/1973 | Fabrizio et al. | 408/239 |
| 5,071,376 | 12/1991 | Walker | 440/49 |
| 5,096,315 | 3/1992 | Yamamoto et al. | 400/221.2 |
| 5,145,213 | 9/1992 | Marrison et al. | 285/2 |
| 5,186,079 | 2/1993 | Gee | 74/607 |
| 5,188,469 | 2/1993 | Nagao et al. | 400/615.2 |
| 5,383,733 | 1/1995 | Zinsmeyer et al. | 400/208 |
| 5,443,372 | 8/1995 | Kanoll | 417/319 |

*Primary Examiner*—Edgar S. Burr
*Assistant Examiner*—Dave A. Ghatt
*Attorney, Agent, or Firm*—Ralph E. Jocke

[57] ABSTRACT

A printer apparatus (10) includes a removable print ribbon cartridge (18). The print cartridge includes a ribbon (20) which is movable by a transmission mechanism (49). A ribbon drive member (65) in said transmission mechanism includes frangible tabs (101). The frangible tabs break responsive to encountering a resistance to movement of said ribbon. The frangible tabs limit the force that may be encountered by a motor (168) used to advance the ribbon thereby preventing damage to the motor and associated drive components and circuitry in the event of a malfunction.

2 Claims, 9 Drawing Sheets

PRINTER APPARATUS FOR AUTOMATED BANKING MACHINE

TECHNICAL FIELD

This invention relates to automated banking machines. Specifically this invention relates to a printer apparatus for an automated banking machine that includes a ribbon cartridge that avoids damage to the machine in the event of a malfunction.

BACKGROUND ART

Automated banking machines which include printer apparatus are well known in the prior art. It is common for such printer apparatus to produce characters on paper or other media using impact printing techniques. Printer mechanisms are commonly used in automated banking machines to produce customer receipts, customer statements and transaction record documents.

Printer mechanisms in automated banking machines often include replaceable cartridges. Cartridges are used to house an ink bearing media such as a printer ribbon. Characters are produced by transferring ink from the ribbon or other ink bearing media to paper as a result of impacts against the ribbon by a print head or similar impact mechanism. As characters are printed a drive mechanism advances the ribbon so that a new ink bearing area moves into proximity with the print head. In this way adequate ink is always available from the ribbon to print the desired characters.

The ink bearing ribbon is typically housed in a replaceable cartridge so that when the ribbon is depleted it may be readily replaced. It is desirable to have a ribbon last as long as possible so that the frequency of replacement may be minimized and the replacement may be accomplished conveniently at times when other components of the machine require servicing. It has become common to use continuous type ribbons for printing so that the ribbon may make multiple passes.

To enable print ribbons to run as long as possible without replacement, the ribbon is often packed in high density relation within the cartridge. This is generally feasible and produces the desired result. However problems may occur in the movement of such ribbons because the high density of a ribbon may cause it to become jammed or otherwise immobilized in the cartridge. When this occurs the print ribbon will stop moving. The ink in the area that is adjacent the print head when the ribbon malfunctions will be quickly depleted and legible printed documents will no longer be produced.

A further and more serious problem that may result from ribbon jamming is damage to the components that are used to move the print ribbon. Typically such drive components include a motor that operates in synchronized relation with the print head to advance the ribbon as characters are printed. This motor is connected to a ribbon drive shaft. The ribbon drive shaft turns a transmission mechanism in the cartridge which advances the ribbon. If the ribbon becomes jammed the motor will no longer be able to turn the transmission mechanism. This overload condition may result in damage to the motor, motor drive components or to the motor drive circuitry.

Such damage may be difficult and costly to repair. Repairs may require replacement of the drive motor which is very time consuming compared to replacing a cartridge. The circuit cards which include the drive circuitry are also costly to replace. Circuit cards may contain circuitry that operates other components of the printer. The necessity of replacing auxiliary components solely because of jamming of a printer cartridge represents a significant waste of resources.

Thus there exists a need for an apparatus and method that avoids damage to a printer apparatus in an automated banking machine in cases where a malfunction results in jamming and inability to move a print ribbon in a ribbon cartridge.

DISCLOSURE OF INVENTION

It is an object of the present invention to provide a printer apparatus.

It is a further object of the present invention to provide a printer apparatus that minimizes the risk of damage in the event of a malfunction.

It is a further object of the present invention to provide a printer apparatus that includes a printer cartridge that limits the amount of resistance that may be encountered in moving an ink bearing media in the cartridge.

It is a further object of the present invention to provide a printer apparatus with a printer cartridge that includes a transmission mechanism which limits the amount of resistance that can be encountered in moving an ink bearing media in the cartridge.

It is a further object of the present invention to provide a printer cartridge in a printing apparatus that includes a transmission mechanism for moving an ink bearing media, that includes a frangible member which breaks responsive to encountering a resistance to movement of the ink bearing media.

It is a further object of the present invention to provide a method for printing with a moving ink bearing media in a printer apparatus which minimizes the risk of damage to the printing apparatus in the event of a malfunction.

It is a further object of the present invention to provide a method for printing with a moving print ribbon on a printer cartridge which includes moving the print ribbon with a transmission mechanism that includes a frangible member which breaks in response to encountering an excessive resistance.

Further objects of the present invention will be made apparent in the following Best Modes for Carrying Out Invention and the appended claims.

The foregoing objects are accomplished in a preferred embodiment of the invention by a printer apparatus which includes a printer cartridge. An ink bearing print ribbon is supported on the cartridge. The cartridge includes a drive member that is rotatably moveable on the cartridge. The drive member is in operative connection with the print ribbon so that rotation of the drive member advances the ribbon to an area where printing on the paper is conducted.

The drive member of the ribbon cartridge is driven by a ribbon drive shaft. The ribbon drive shaft is in connection with a drive motor. The ribbon drive shaft engages a pair of opposed radially extending tabs which extend in a recess in the drive member of the printer cartridge. The tabs are frangible and break away when the drive member encounters a resistance to movement which is above a normal level.

When the ribbon cartridge is operating properly, the ribbon drive shaft moves in response to rotation of the motor to turn the drive member of the cartridge. The amount of resistance to movement of the ribbon is sufficiently low so that the needed amount of force to advance the ribbon may be readily transmitted through the tabs on the drive member without affecting the structural integrity thereof. In the event of a ribbon jam or other malfunction in the printer cartridge, the force required to turn the drive member will increase. When a resistance sufficient to break the tabs is encountered, the ribbon drive shaft will break the tabs. As a result the printer ribbon will stop moving while the ribbon drive shaft continues to freely turn in the recess of the drive member.

The apparatus and method of the present invention avoids subjecting drive line components to excessive resistance. This minimizes the risk of damage to drive linkages, the motor and its driving circuitry.

BEST MODES FOR CARRYING OUT INVENTION

Figure 1:
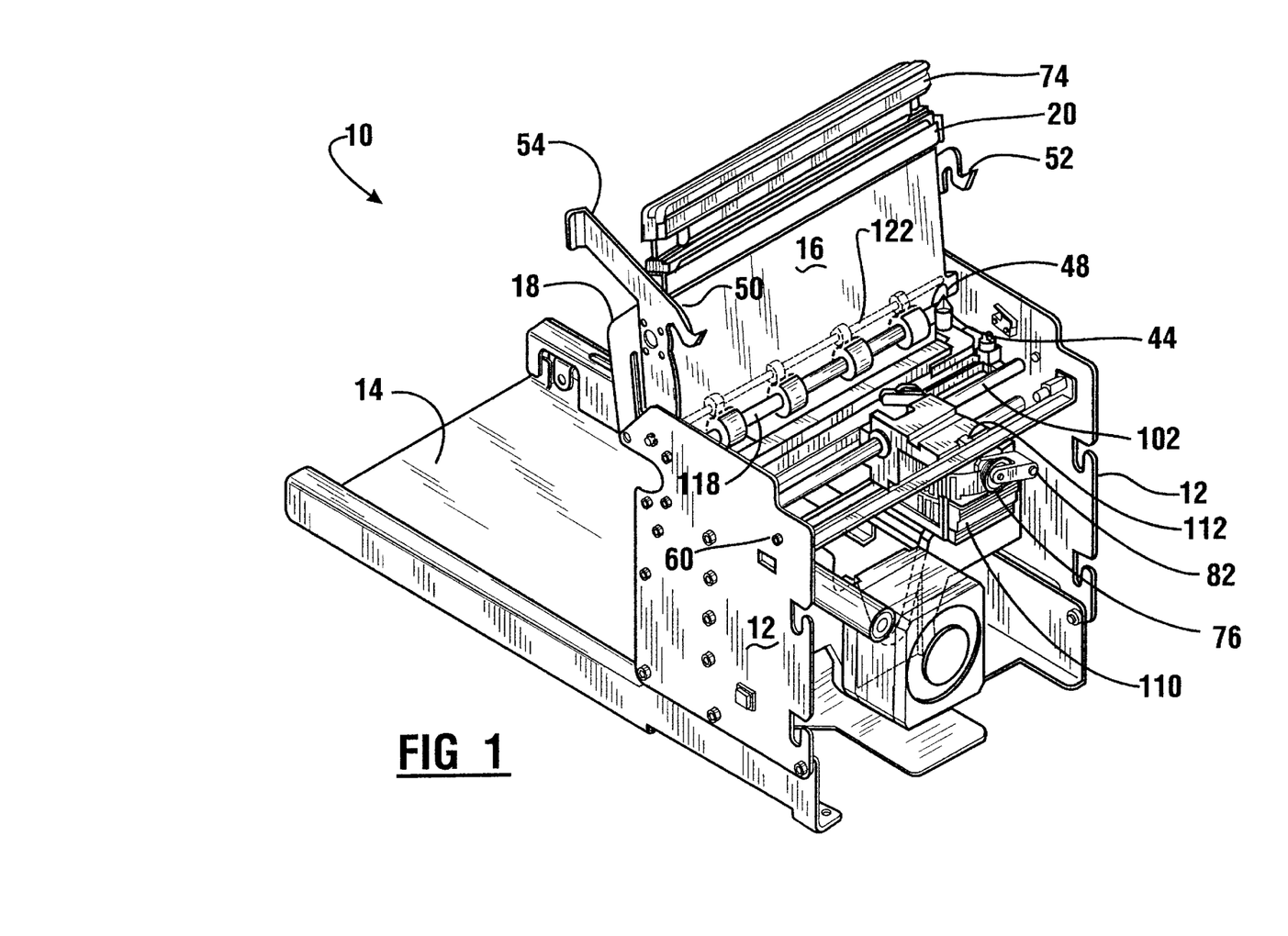
FIG. 1 is a side isometric view of a printer apparatus for an automated banking machine shown in an open condition for servicing.
Figure 6:
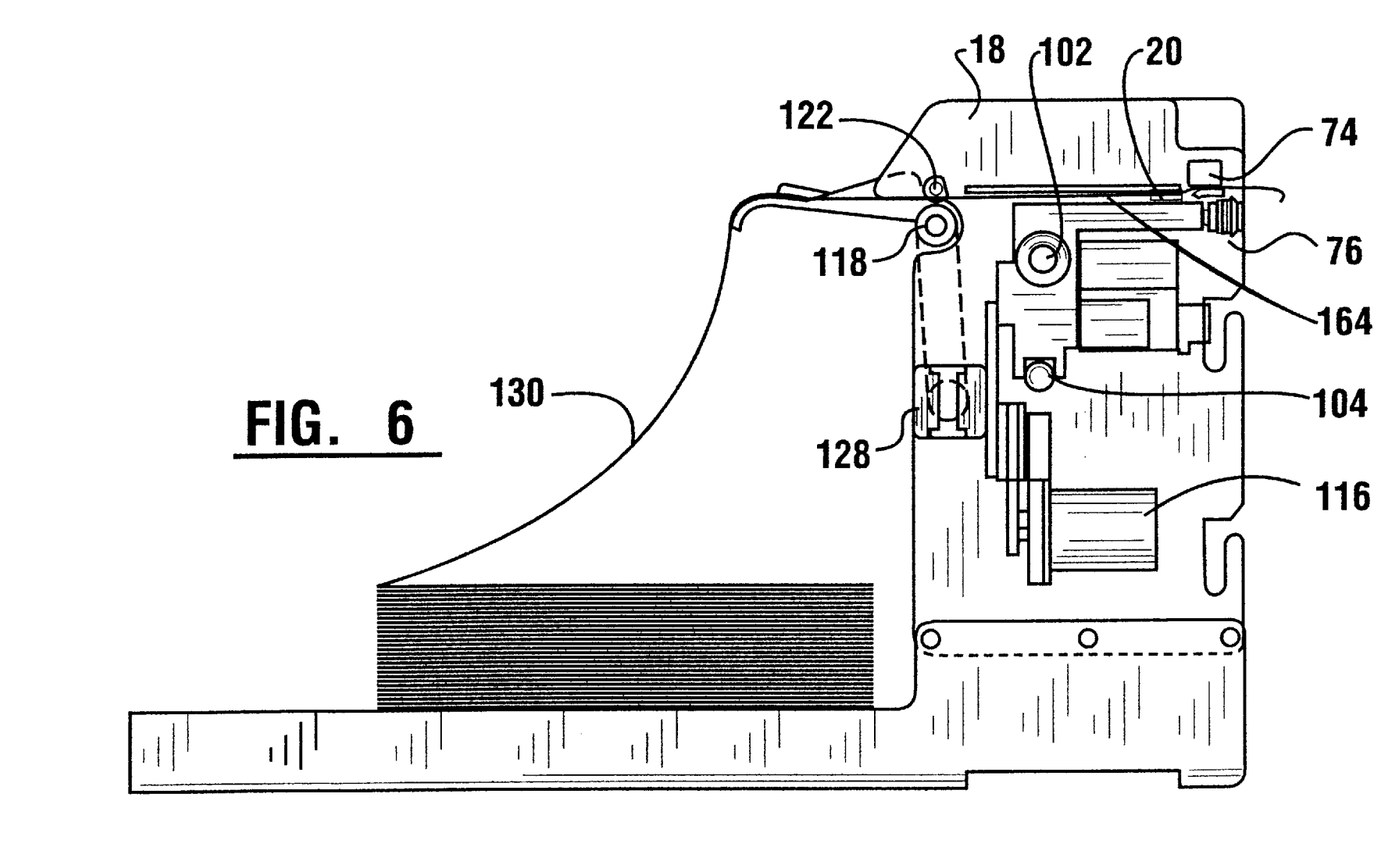
FIG. 6 is a side cross sectional schematic view of the printer apparatus shown in FIG. 1.

Referring now to the drawings and particularly to FIG. 1 there is shown therein a printer apparatus of a preferred embodiment of the invention, generally indicated 10. The apparatus includes a housing including a pair of spaced side walls 12. The side walls are connected to a tray portion generally indicated 14. The tray portion is used for holding a supply of paper 130 as best shown in FIG. 6.

The printer apparatus further includes a top plate 16 which is pivotally mounted between the side walls. In FIG. 1 the top plate 16 is shown in a raised position and a bottom guide plate is not shown to expose the other components of the printer. When the printer device is in operation the top plate is in a down position and a lower guide plate for supporting the paper as it moves in the apparatus are positioned as shown in FIG. 6.

Figures 2, 3:
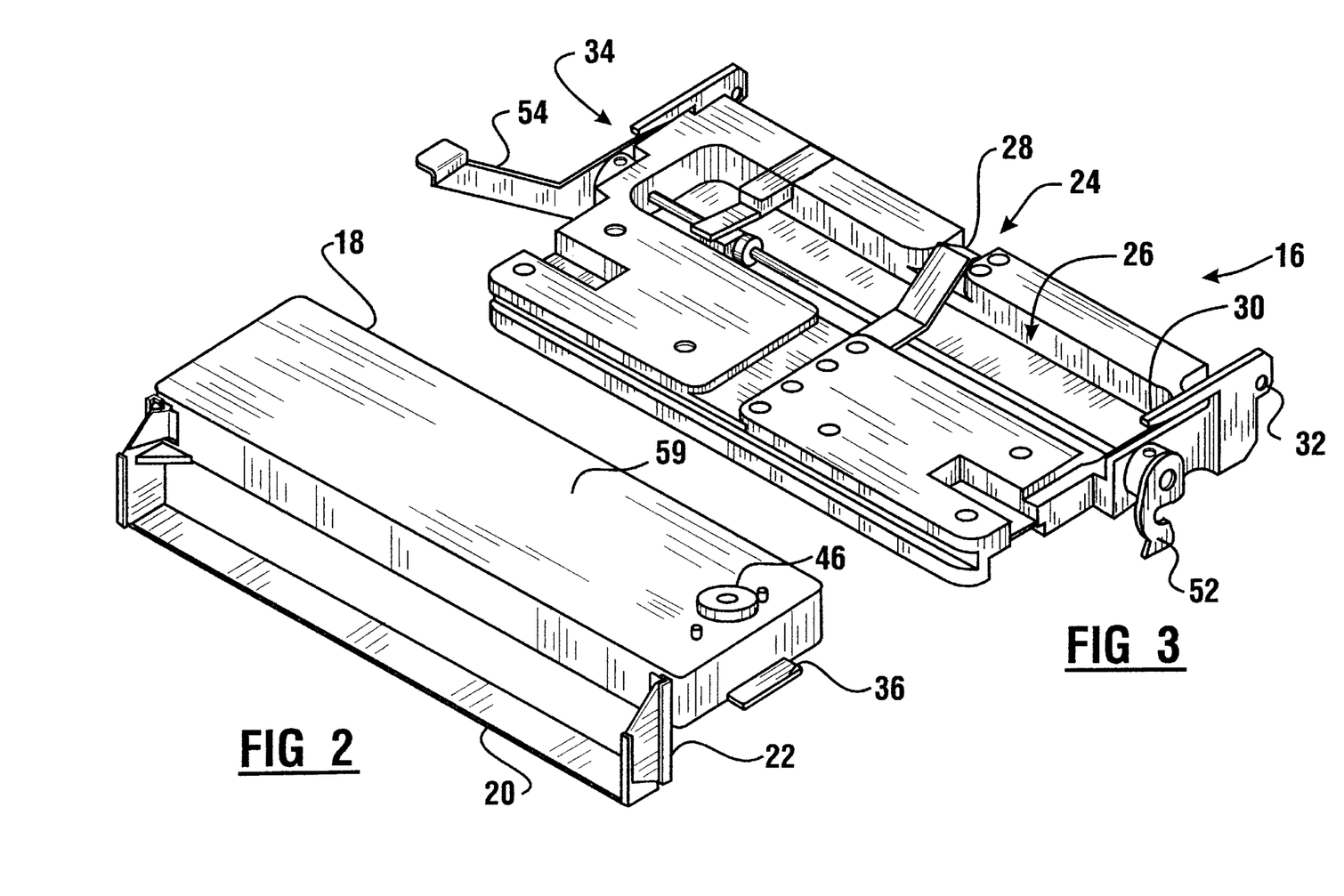
FIG. 2 is a side isometric view of a printer cartridge used in an embodiment of the printer apparatus of the present invention.
FIG. 3 is a side isometric view of the top plate of the printer apparatus shown in FIG. 1.

The apparatus of the present invention includes a printer cartridge 18 which is shown in greater detail in FIG. 2. Cartridge 18 holds a print ribbon 20 which serves as an ink bearing media. Ribbon 20 extends outside the cartridge and across the underside of the top plate 16 when the print cartridge is mounted thereon. Print cartridge 18 further includes a pair of downward extending ribbon guides 22. The ribbon guides direct the ribbon 20 into and out of the interior of the cartridge. The ribbon guides 22 straddle the top plate 16 of the printer apparatus when the cartridge is mounted thereon.

As shown in FIG. 3, top plate 16 includes a longitudinally extending recess 24 in the top thereof. Recess 24 extends on both sides of a laterally extending depressed area 26. A leaf spring 28 extends upwardly in a forward section of recess 24. The leaf spring includes a pointed angled top which is directed upwards.

The top plate further includes a pair of spaced finger projections 30. The finger projections include openings 32 at the front thereof which enable the top plate to be pivotally mounted to pins on the side walls 12. The finger projections 30 also define slots 34 which extend between the projections and an upper surface of the top plate.

The printer cartridge 18 includes on each side an outward extending wing projection 36. The wing projections 36 are sized for acceptance in slots 34. The wing projections 36 are positioned so that when the cartridge is mounted on the top plate, the finger projections 30 hold the cartridge 18 in close abutting relation to the top plate.

Figures 4, 5:
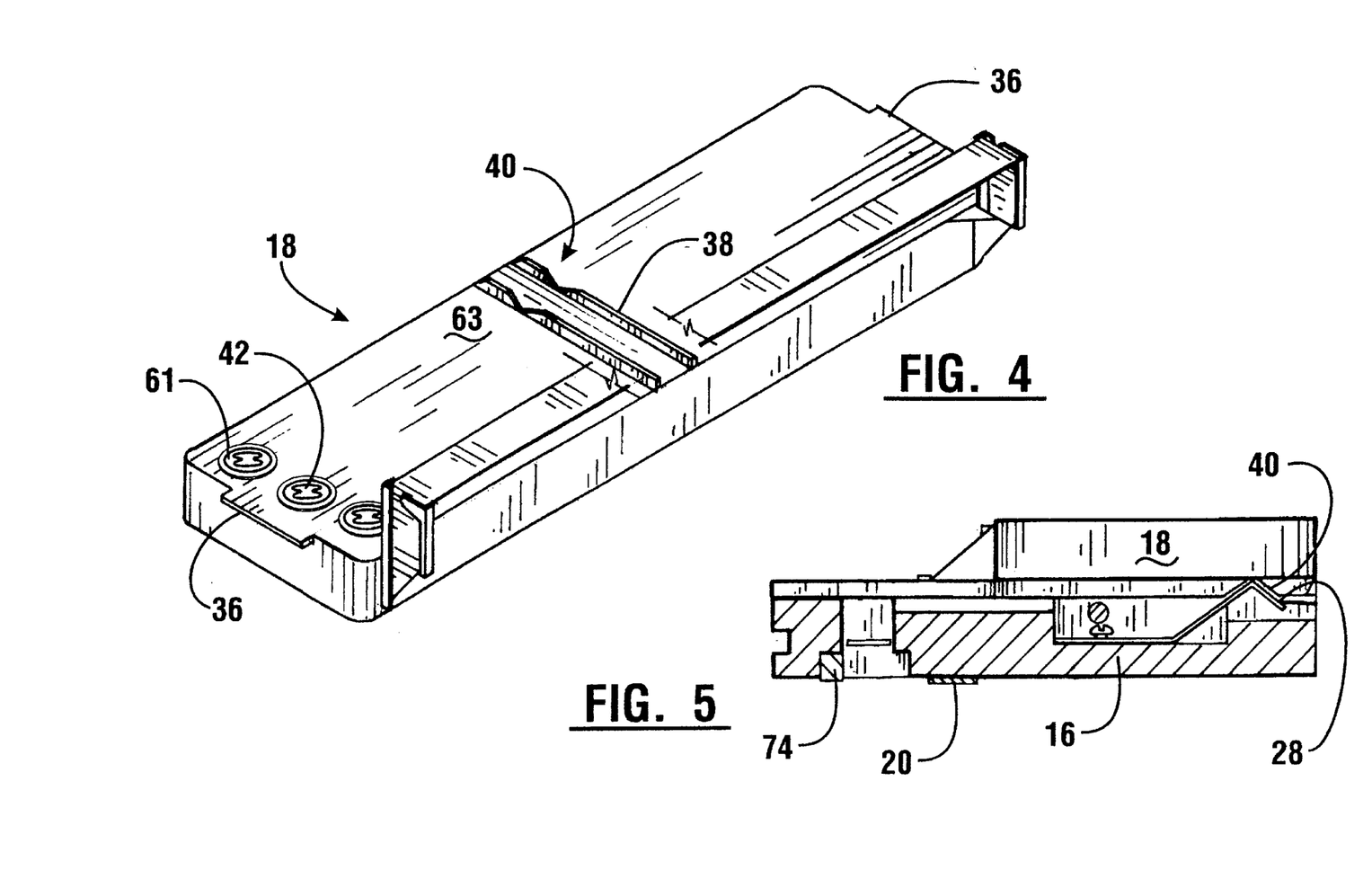
FIG. 4 is a bottom side isometric view of the printer cartridge shown in FIG. 2.
FIG. 5 is a side cross sectional view of the printer cartridge shown in FIG. 2 engaged with the top plate shown in FIG. 3.

As shown in FIG. 4 the lower side of cartridge 18 includes a pair of spaced downward extending projections 38. The downward extending projections extend longitudinally the length of the cartridge. Each projection includes a v-shaped notch 40 near the front of the cartridge. When the print cartridge 18 is properly installed on the top plate, the pointed leaf spring 28 nests in the notches 40. The notches are oriented so that the leaf spring is engaged therein when the wing projections on the cartridge are inserted to the full depth of the slots 34 formed by the finger projections 30.

The construction of the printer cartridge and top plate assures that the cartridge is in the proper position for printing documents. It further provides for an easy snap-in and snap-out fit. This enables the cartridge to be changed by a non-technician such as a bank teller. This construction also has advantages in that it is particularly well suited for use within a confined space in an automated banking machine. The cartridge is readily guided into position by feel which enables it to be installed in an obscure location. The spring 28 also assures that the cartridge 18 is uniformly locked into operative position on the top plate and provides a locking action which can be readily felt by a person installing the cartridge.

As shown in FIG. 4 apertures of ribbon drive recesses 42 are accessible on the underside of cartridge 18. As later discussed in detail, the ribbon drive recesses are associated with a transmission mechanism within the printer cartridge that enables movement of the print ribbon thereon. The transmission mechanism includes a force limiting mechanism that limits the amount of force that may be transmitted to move the print ribbon and likewise limits the amount of resistance that may be encountered by a system that moves the ribbon.

Figure 7:
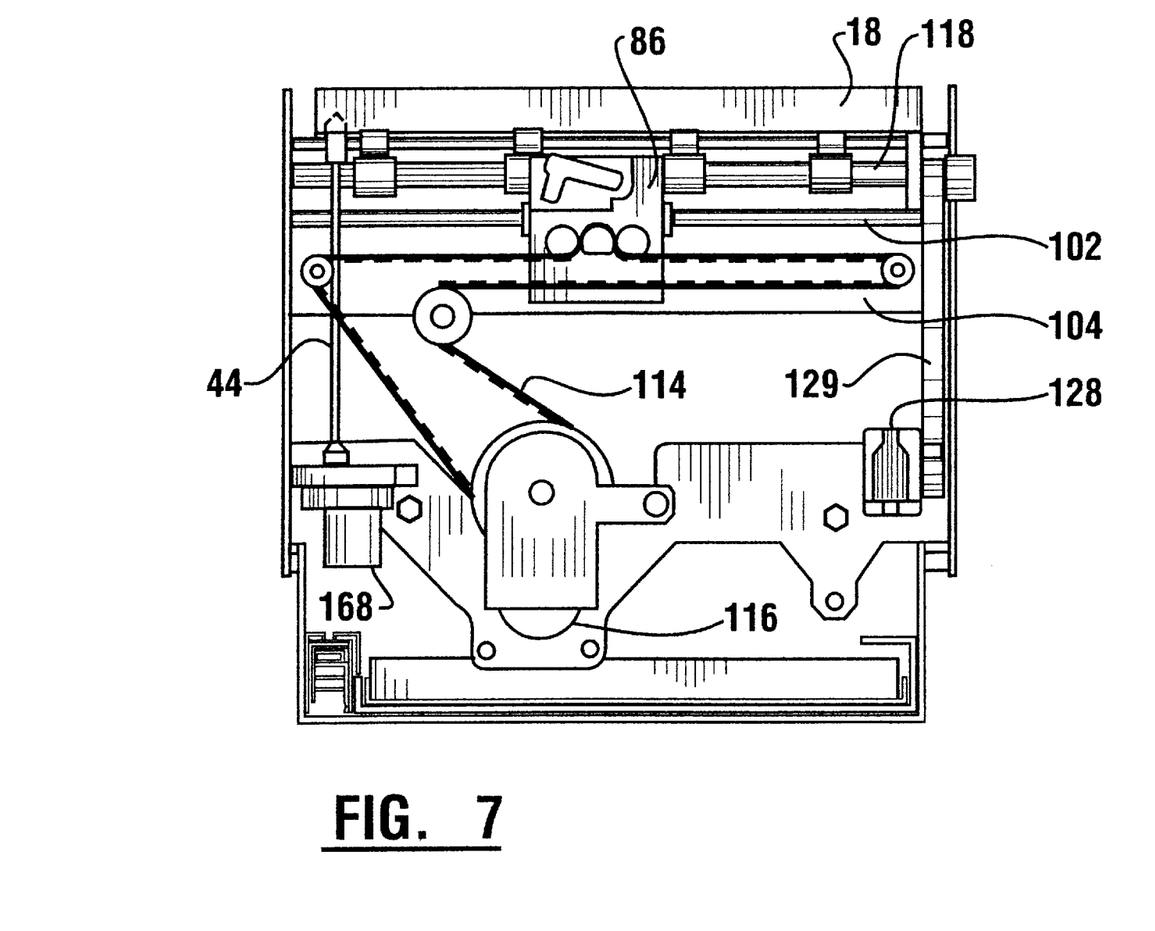
FIG. 7 is a rear plan schematic view of the printer apparatus shown in FIG. 1.

An engaging end of ribbon drive shaft 44 which is best shown in FIG. 7, is engaged in one of the recesses 42 when the cartridge is in operative position. Ribbon drive shaft 44 is driven by a motor 168. The printer apparatus further includes a print head 110 which is laterally moveable on a guide rod 102 and a ribbon guide bar 104. A belt 114 connects the print head to a stepper motor 116.

The printer further includes a roll drive motor 128 which is connected by a belt 129 to a lower roll shaft 118. As shown in FIG. 6, in the operative condition of the printer, rolls on shafts 118 and 122 move the paper through the printer apparatus.

Print head 110 further includes an impact area 112. Impact area 112 includes a matrix of selectively actuatable impact pins. The impact pins in area 112 are selectively actuated to produce sets of alpha-numeric or other characters produced by the printer. Print head 110 also has supported thereon a cutter disk 76, which is rotatably mounted on an arm 82. Cutter disk 76 may be selectively raised and lowered so as to cut the paper extending through the printer. The cutting is accomplished by engaging the cutter disk 76 with a cutter bar 74 mounted on the top plate, and then moving the print head across the width of the paper.

In the operative position of the invention the top plate 16 is latched in the down position by the engagement of latching levers 50 and 52 with pins 60 that extend from the side walls. The latching levers are connected together by a shaft as shown in FIG. 3. Latching lever 50 has a handle portion 54 for moving the latching levers.

Paper 130 is fed from a stack as shown in FIG. 6 and extends between the rolls supported on shafts 118 and 122. The paper further extends between a guide plate 164 and above the exposed portion of ribbon 20. The print head 110 is actuated and moved under the control of a processor so as to produce characters on the paper through the impacts of impact pins in impact area 122.

The impacts of the pins of the print head on the exposed portion of the ribbon 20 transfer ink from the ribbon to the paper 130. Characters are formed from a matrix of dots produced by the impacts of the pins. The print head is moved selectively by motor 116 under control of the processor to produce printing at desired locations across the paper. The paper is selectively advanced longitudinally by the rollers on shafts 118 and 122 by motor 128 under the control of the processor so as to produce impressions created by the print head at various longitudinal positions along the paper. The processor controlling the printer apparatus selectively moves the print head and the paper, and fires the impact pins to produce the desired characters.

Ribbon drive motor 168 also operates under the control of the processor and advances the ribbon in synchronization with the operation of the print head 110. The ribbon drive shaft 44 engages the recess 42 and rotates a ribbon drive post portion 61. The rotation of the drive post portion drives a transmission mechanism in the cartridge which moves the ribbon.

The cartridge 18 incorporates a force limiting mechanism which is a fundamental aspect of the present invention. The force limiting mechanism minimizes the risk of damage to ribbon drive line components including the ribbon drive motor 168 and related motor drive circuitry, in the event of a malfunction.

Figure 8:
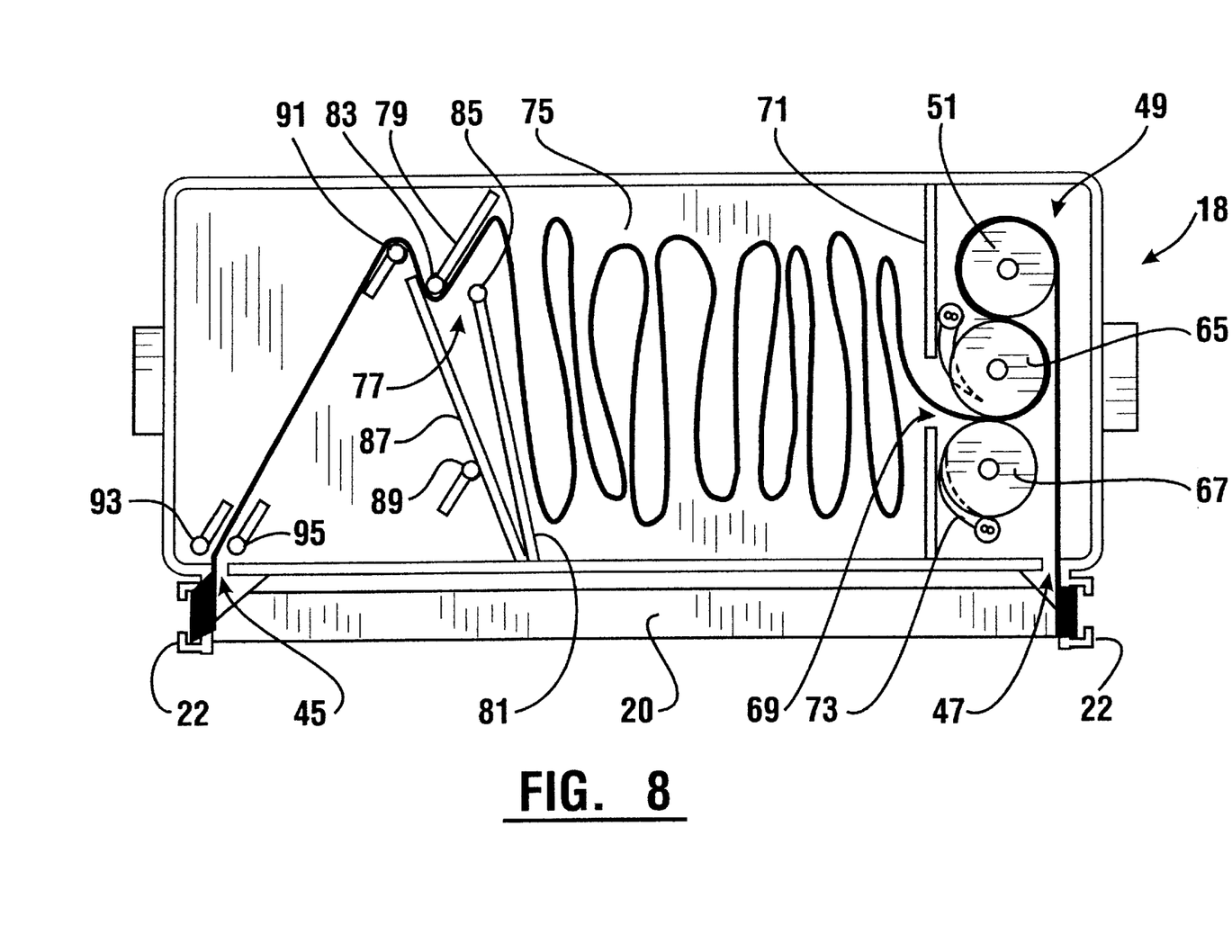
FIG. 8 is a top sectional view showing the interior of the printer cartridge shown in FIG. 2.

A schematic view of the interior of cartridge 18 is shown in FIG. 8. Print ribbon 20 extends out of cartridge 18 through a first opening 45. It passes over an angled top portion and down the ribbon guide 22. The print ribbon 20 passes to the opposed ribbon guide 22 and into a second opening 47 in the cartridge.

Figure 9:
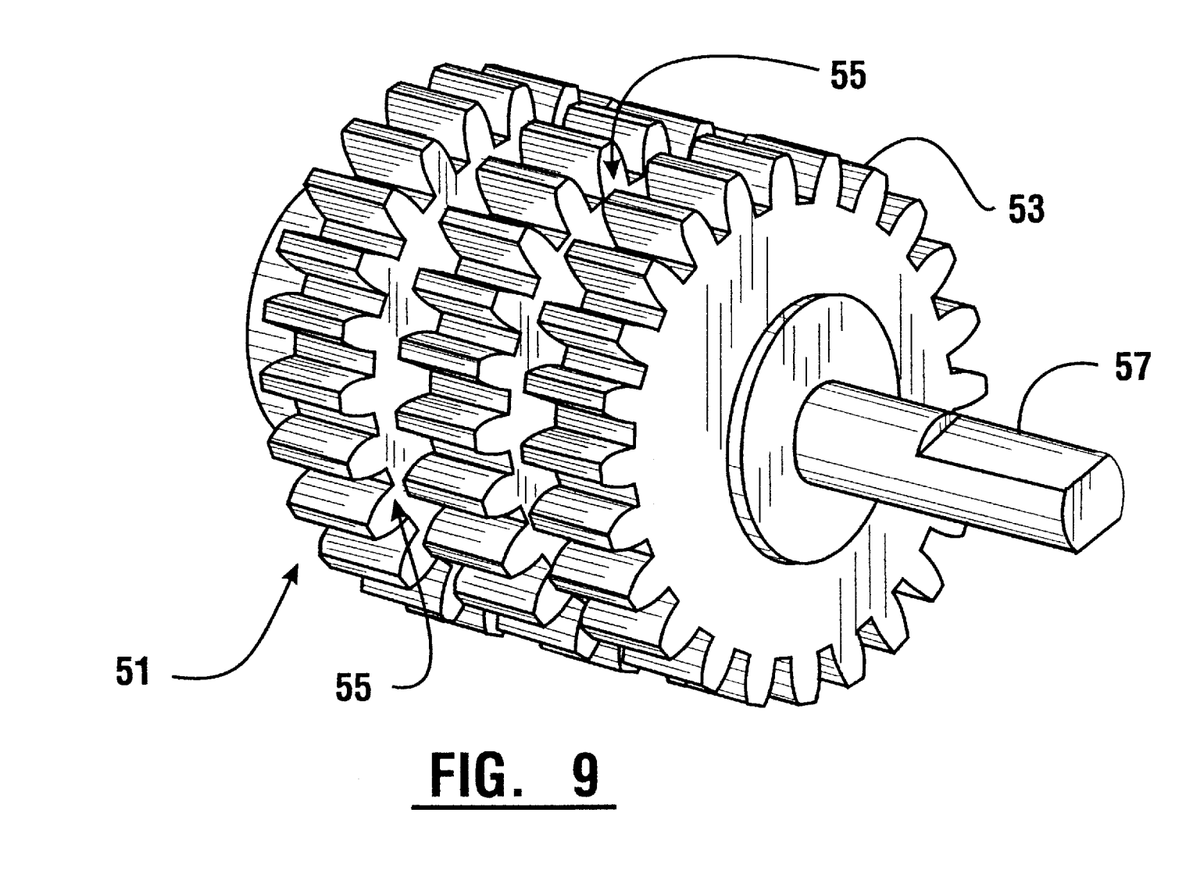
FIG. 9 is an isometric view of a ribbon drive gear of the printer cartridge.
Figure 10:
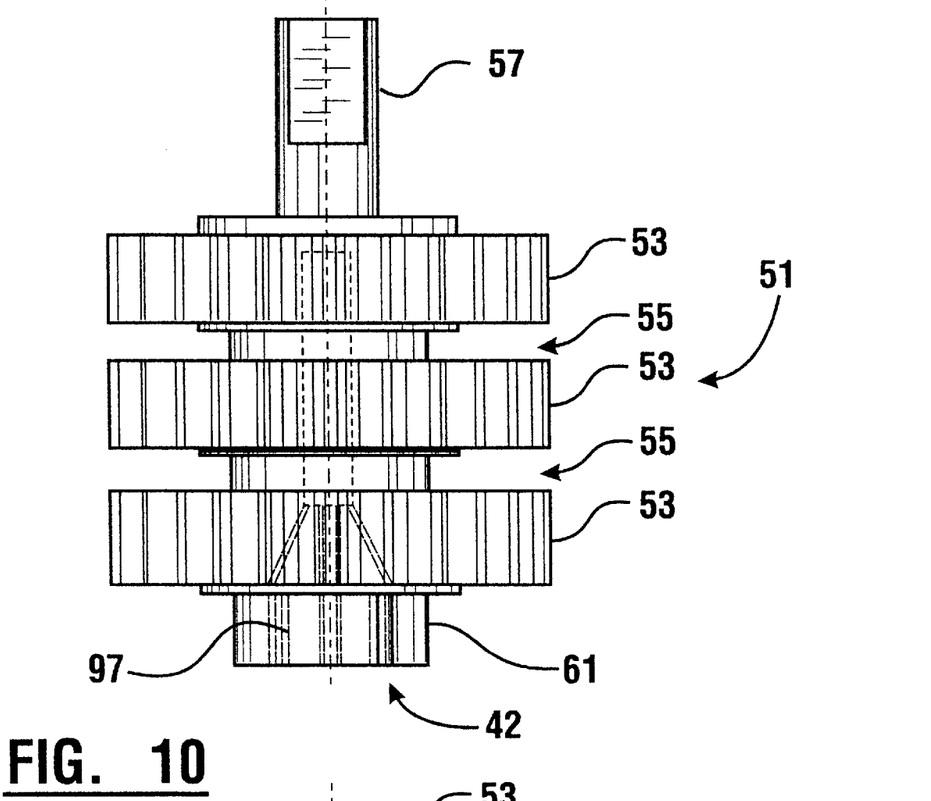
FIG. 10 is a side view of the drive gear shown in FIG. 9 engaged with an engaging end of a ribbon drive shaft.

The interior of the cartridge includes a transmission mechanism generally indicated 49. Transmission mechanism 49 includes three identical ribbon drive gears or drive members 51, 65, 67. Ribbon drive member 65 is shown in greater detail in FIGS. 9–11. Each ribbon drive member includes annular sets of gear teeth 53 and a pair of annular recesses 55 between the sets of gear teeth.

Each ribbon drive member includes a top shaft portion 57. Each top shaft portion 57 includes flats thereon. As shown in FIG. 2, the top shaft portions 57 of ribbon drive members 51, 65, 67 are journaled in a cover 59 of cartridge 18. A knob 46 is attached to top shaft portion 57 of ribbon drive member 65. Knob 46 may be manually rotated to advance ribbon 20 in a manner later explained.

Each of ribbon drive members 51, 65, 67 each include drive post portions 61. Drive post portions 61 are journaled in openings in a bottom wall 63 of cartridge 18 as shown in FIG. 4. Drive post portions 61 each include axially extending ribbon drive recesses 42 therein. Although in the preferred embodiment only the recess 42 in driving member 65 is engaged by the ribbon drive shaft 44, in other embodiments the transmission mechanism may be driven by a drive shaft engaging recesses in the other driving members.

Referring again to FIG. 8, inside the cartridge 18 ribbon 20 passes inwardly from second opening 47 and extends about ribbon drive member 51 approximately 270°. Ribbon 20 thereafter disengages from ribbon drive member 51 and engages ribbon drive member 65. Ribbon 20 extends approximately 180° around ribbon drive member 65. Ribbon 20 is then pushed by ribbon drive member 65 and ribbon drive member 67, through an opening generally designated 69, in an internal wall 71 in the cartridge.

A pair of arcuate vane members 73 guide the ribbon off of ribbon drive members 65 and 67 and into the opening 69. Vane members 73 include projections that extend in the annular recesses of the ribbon drive members so as to separate the ribbon therefrom. The gear sets 53 firmly engage and move the ribbon therewith. The vane members serve to separate the ribbon from the gear sets so it passes into opening 69.

Once the ribbon passes through opening 69 it accumulates in compressed relation in a compartment 75 in the cartridge. The ribbon exits compartment 75 through an opening 77. Opening 77 extends between angled walls 79 and 81 which terminate at guide pins 83 and 85 respectively.

A leaf spring 87 is biased against pin 83 by a post 89. Ribbon 20 passes between leaf spring 87 and guide pin 83. As a result, leaf spring 87 applies a drag force to the ribbon and further acts to prevent any excess ribbon from exiting out of compartment 75 through opening 77.

Ribbon 20 passes over a guide pin 91. The ribbon 20 then passes between a pair of guide pins 93, 95 and out first opening 45. As can be seen from the schematic view in FIG. 8, ribbon 20 is a continuous ribbon which endlessly moves on the cartridge between guides 22. The cartridge may also include other features and components, known to those skilled in the art, including devices for preventing reverse movement of the ribbon and for preventing damage as a result of such attempted movement.

In operation, rotational movement of ribbon drive member 65 in the clockwise direction as shown in FIG. 8, causes the ribbon to advance. The counterclockwise rotation of ribbon drive member 51 that results from movement of member 65, pulls ribbon 20 into the cartridge through opening 47. The gear sets on the ribbon drive members solidly engage the ribbon and minimize the risk of slippage. Knob 46 which is attached to the top shaft portion 57 of the ribbon drive member 65, may be manually rotated to advance the ribbon.

Observation of the knob 46 during printer operation may also serve to verify that the ribbon is advancing properly. Alternatively, an optical or other sensing mechanism may be provided for automatically sensing movement of the knob or the top shaft portions of the driving members. This may be done by including indicia on the knob or top shaft portions, and a sensing device that can sense rotation of such knob or members. This may be done with optical sensors or other similar means.

In operation of the apparatus 10, the ribbon drive shaft 44 extends through an opening 48 in the top plate 16 when the top plate is in the lowered condition. The upper portion of ribbon drive shaft 44 which extends through opening 48 includes an engaging end, generally indicated 97 in FIGS. 10 and 11. Engaging end 97 is a conventional construction that includes four inwardly tapered vanes arranged in a cross shape. Engaging end 97 is sized for acceptance in ribbon drive recesses 42 in the driving members.

Figure 12:
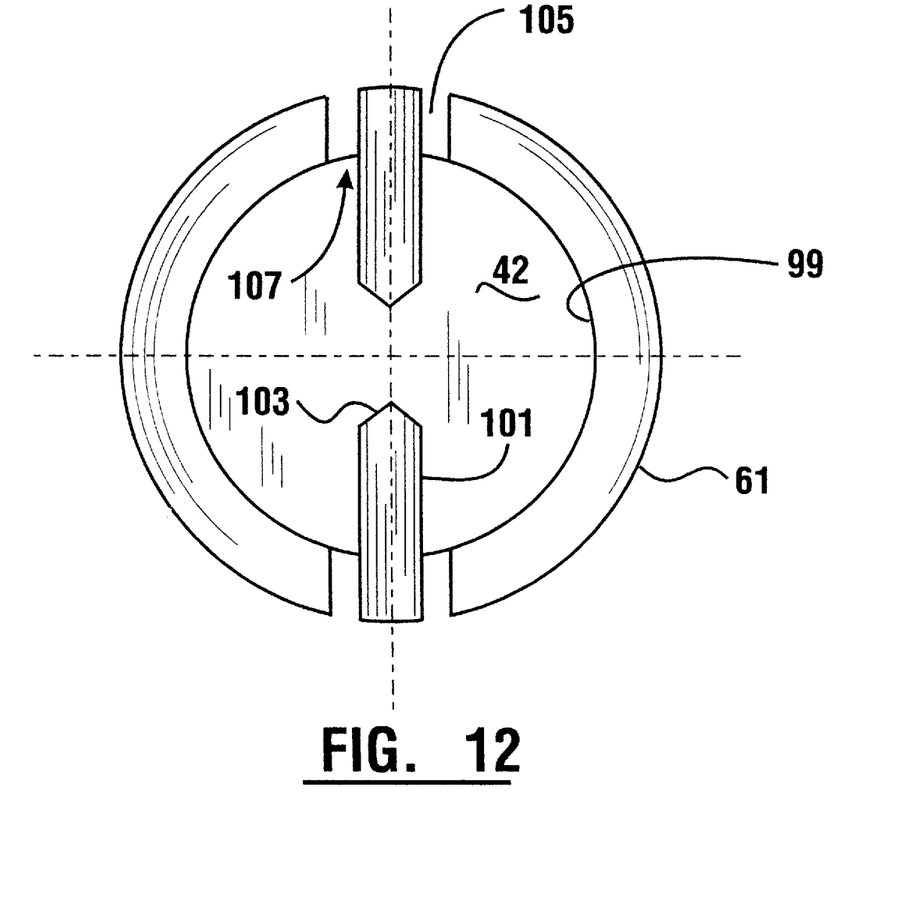
FIG. 12 is an enlarged bottom view of a recess and tabs of the ribbon drive member portion shown in FIG. 11.

A recess 42 in a drive post portion 61 of driving member 65 is shown in greater detail in FIG. 12. The recess 42 extends from an aperture or opening and is bounded by an axially extending generally annular wall 99. A pair of diametrically opposed, radially extending tabs 101 extend inwardly from annular wall 99. Tabs 101 terminate in pointed free ends 103. Slots or cuts 105 which extend through wall 99 are angularly spaced on each side of tabs 101 adjacent annular wall 99.

Tabs 101 serve as frangible members in the transmission mechanism for driving the ribbon in the cartridge. Tabs 101 are configured to shear in break areas 107 adjacent a base of each tab in response to the drive member encountering a resistance which is beyond a force that may be safely produced by ribbon drive motor 168 and the associated motor drive circuitry.

In the preferred form of the invention, the tabs are preferably about 0.1016 cm (0.040 inches) in width and are preferably made of a plastic material that is breakable in response to excessive torque. The cuts 105 provide that the tabs are connected to the remainder of the driving member in the area between the cuts. The predetermined area of connection between the tabs to the remainder of the driving member results in the tabs breaking more predictably in circumstances where excessive force is encountered due to a jam. The tabs are designed to tolerate without fracture short transient force fluctuations which are sufficiently small as to not be indicative of a malfunction.

Figure 11:
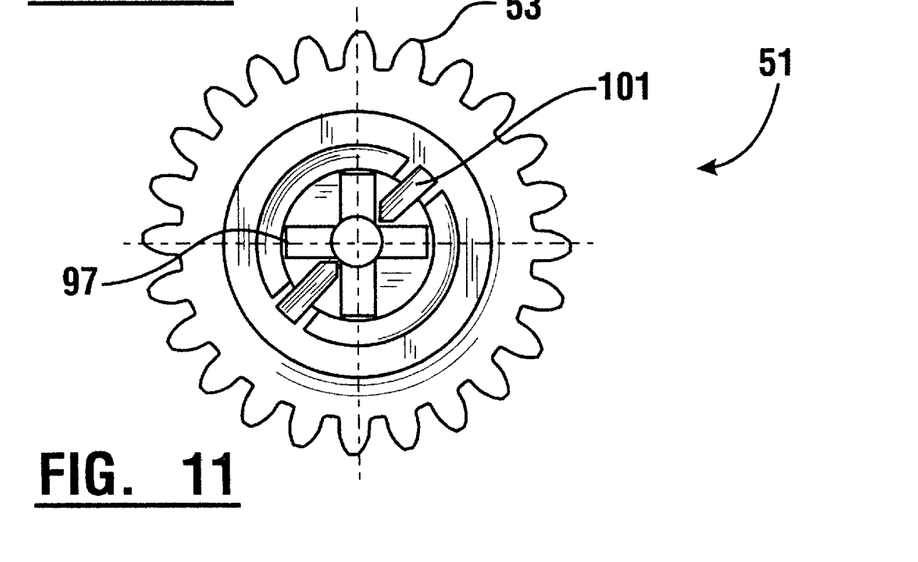
FIG. 11 is a bottom plan view of a ribbon drive member portion of the drive gear shown in FIG. 10 engaged with the engaging end of the ribbon drive shaft.

In operation of the invention the engaging end 97 of the ribbon drive shaft 44 engages tabs 101 in the manner shown in FIG. 11. The pointed free ends 103 nest between the vanes of the engaging end and facilitate the transmission of force therefrom. Tabs 101 transfer sufficient force from the engaging end to the ribbon drive post portion to move the ribbon when the ribbon cartridge is functioning properly. In such conditions the amount of force required to turn the engaged ribbon drive member is within a range that is well within the design capability of the ribbon drive line components, including the drive motor 168 and the associated drive circuitry.

If a jam occurs within the ribbon cartridge the ribbon will no longer be readily movable. Alternatively, if the ribbon becomes caught due to a malfunction of the printer head or some problem within the printer, the ribbon may no longer be readily movable. As a result when the motor 168 and ribbon drive shaft 44 attempt to turn the engaged ribbon drive member, a resistance to ribbon movement will be encountered which is in excess of a force safely producible by the motor drive line components. When this occurs the frangible tabs 101 deform and break enabling the engaging portion 97 to rotate freely in the recess 42. This avoids the problem of the motor and associated drive circuitry being stopped and overloaded, in which condition damage may occur.

The amount of force which can be transmitted through the frangible members can be varied to suit the construction of the particular cartridge and motor drive system. The frangible tabs may be varied in material, axial length and angular thickness to vary the level of resistance at which they will break. Preferably the tabs do not extend the full axial length of the recess. This avoids engagement with the engaging member in the upper tapered portion of the recess where control of the breaking force is less predictable.

It should be mentioned that while in the preferred form of the invention frangible tabs are used, in other embodiments of the invention other frangible members or force limiting mechanisms may be incorporated in operative connection with the transmission mechanism. By way of example, the present invention may in alternative embodiments include tabs which rather than being frangible, are merely deformable so as to limit the resistance. In such embodiments the configuration and materials of the tabs and annular wall would be such that the tabs deform without breaking in response to a resistance, to enable the motor drive shaft to turn in the recess. Other variations of the present invention will be apparent to those skilled in the art from the teachings herein.

Thus the new printer apparatus of the present invention achieves the above stated objectives, eliminates difficulties encountered in the use of prior devices and systems, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described.

In the following claims any feature that is described as a means for performing a function shall be construed as encompassing any means capable of performing the recited function and shall not be limited to the particular means shown in the foregoing description or mere equivalents.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

We claim:

1. A printer apparatus comprising:

a print media movably supported on a cartridge;

a drive post movably supported on the cartridge, the drive post in operative engagement with the print media such that in an operational condition rotational movement of the drive post causes movement of the print media;

the drive post including an axially extending recess bounded by a generally annular wall, a pair of generally radially extending and generally opposed tabs in supporting connection with the annular wall and extending inwardly in the recess, whereby the tabs are adapted to operatively engage a ribbon drive shaft such that rotation of the ribbon drive shaft rotates the ribbon drive post by engagably moving the tabs, and wherein in response to the drive post presenting a resistance greater than a predetermined resistance to rotation the tabs deform sufficiently to enable the ribbon drive shaft to rotate relative to the ribbon drive post within the annular recess.

2. The printer apparatus according to claim 1 wherein the tabs are frangible, and wherein the tabs operatively separate from the annular wall responsive to movement of the ribbon drive shaft after the ribbon drive post presents greater than the predetermined resistance to movement.

* * * * *